United States Patent
Rego et al.

(10) Patent No.: US 7,642,316 B2
(45) Date of Patent: *Jan. 5, 2010

(54) RUBBER MODIFIED MONOVINYLIDENE AROMATIC POLYMERS AND FABRICATED ARTICLES PREPARED THEREFROM

(75) Inventors: Jose M. Rego, Heikant (NL); Aude G. Pochon, Mecklenburgstraat (NL); Amaia Montoya-Goni, Bergen op Zoom (NL)

(73) Assignee: Dow Global Technologies, Inc., Midland, MI (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/191,817

(22) Filed: Jul. 28, 2005

(65) Prior Publication Data

US 2006/0084761 A1    Apr. 20, 2006

Related U.S. Application Data

(63) Continuation-in-part of application No. 10/965,531, filed on Oct. 14, 2004, now Pat. No. 7,208,547.

(51) Int. Cl.
*C08L 53/02* (2006.01)
*C08L 51/04* (2006.01)

(52) U.S. Cl. .............................. 525/70; 525/71; 525/86; 523/201

(58) Field of Classification Search ................... 525/70, 525/71, 86, 98, 99; 523/201
See application file for complete search history.

(56) References Cited

U.S. PATENT DOCUMENTS

| | | | |
|---|---|---|---|
| 3,976,721 A | 8/1976 | Satake et al. | |
| 4,096,205 A | 6/1978 | Reith | |
| 4,409,369 A | 10/1983 | Lyons et al. | |
| 4,493,922 A | 1/1985 | Echte et al. | |
| 5,231,142 A * | 7/1993 | Tsubokura et al. | 525/316 |
| 5,491,195 A | 2/1996 | Schrader et al. | |
| 6,221,471 B1 | 4/2001 | Salmang et al. | |
| 6,248,807 B1 | 6/2001 | Sosa et al. | |
| 6,251,995 B1 * | 6/2001 | Hesse et al. | 525/191 |
| 6,437,043 B1 | 8/2002 | Sosa et al. | |
| 6,489,378 B1 | 12/2002 | Sosa et al. | |
| 6,545,090 B1 | 4/2003 | Demirors et al. | |
| 2003/0008973 A1 | 1/2003 | Sosa et al. | |
| 2003/0055177 A1 | 3/2003 | Demirors | |
| 2005/0148720 A1 * | 7/2005 | Li et al. | 524/474 |

FOREIGN PATENT DOCUMENTS

| | | |
|---|---|---|
| DE | 3345377 A1 | 12/1983 |
| DE | 3409656 A1 | 3/1984 |
| DE | 3425457 A1 | 7/1984 |
| DE | 3425458 A1 | 7/1984 |
| EP | 113067 B1 | 12/1983 |
| EP | 0143500 | 1/1984 |
| EP | 196013 A2 | 3/1986 |
| GB | 1514005 | 7/1975 |
| JP | 46015017 | 4/1971 |
| JP | 8-157545 | 6/1996 |
| JP | 11080467 | 3/1999 |
| JP | 2906962 B2 | 6/1999 |
| WO | WO 99/09080 | 2/1999 |

OTHER PUBLICATIONS

Yoshima et al., electronic translation of the specification of JP 08157545 (Jun. 1996).*
Grocela and Nauman, Impact polystyrenes of novel and controlled morphology, Polymeric Materials Science and Engineering (1990), 63 488-92, Isermann Dep. Chem. Eng., Rensselaer Polytech. Inst., Troy, NY, USA.
K. Sardelis, H.J. Michels and G. Allen, F.R.S, Toughened polystyrene containing block, graded block, and randomized copolymers of butadiene-styrene.; Department of Chemical Engineering and Chemical Technology, Imperial College, London, SW7 2BY (Received Jun. 30, 1986).
G. Holden, et al; Thermoplastic Elastomers 2nd Edition; Hanser/Gardner Publications, Inc., 1996, ISBN 1-56990-205-4, pp. 48-70.
H. Hsieh and R. Quirk, Anionic Polymerization: Principles And Practical Applications, Marcel Dekker Inc., 1996, ISBN 0-8247-9523-7, pp. 307-321, and 475-516.
Jun Gao and Chi Wu, Journal Of Applied Polymer Science, vol. 77 (2000), p. 1165, "A Novel Application of Using a Commercial Fraunhofer Diffractometer to Size Particles Dispersed in a Solid Matrix".
U.S. Appl. No. 10/965,531, filed Oct. 14, 2004, Rego et al. (co-pending application).

* cited by examiner

*Primary Examiner*—Jeffrey C Mullis

(57) ABSTRACT

The present invention is a rubber modified monovinylidene aromatic polymer composition which can be used in conventional thermoforming or other highly orienting forming or shaping processes to produce tough, cost effective, transparent containers or other packaging materials.

7 Claims, No Drawings

RUBBER MODIFIED MONOVINYLIDENE AROMATIC POLYMERS AND FABRICATED ARTICLES PREPARED THEREFROM

This application is a continuation in part (CIP) of prior application Ser. No. 10/965,531, filed Oct. 14, 2004, now U.S. Pat. No. 7,208,547.

The present invention relates to improved rubber modified monovinylidene aromatic polymers.

Rubber modified monovinylidene aromatic polymers, such as rubber modified or high impact polystyrene (HIPS), cost effectively provide a range of physical properties that can be balanced to suit numerous applications. These types of polymers are frequently used in food and drink containers and packaging products which can be produced in a variety of methods including molding and thermoforming from sheet material. For use in these applications, such polymers require a balance of properties including good impact strength, tensile strength and transparency properties. Currently, the preferred polymer resins for these applications are generally prepared by blending a separate styrene-butadiene (SB) block copolymer rubber, often called a "K Resin," with an unmodified polymer matrix, usually referred to as general purpose polystyrene or GP PS. This blended product has the rubber component dispersed in the matrix polymer in a mostly co-continuous morphology. These blends can provide a sufficient balance of toughness and transparency in some thermoformed articles but, depending upon the requirements in specific applications, have been found to have important and significant shortcomings in a number of areas including their cost, processability, recyclability, gel formation, surface gloss, printability and taste/odor.

Attempts have also been made to obtain the improved balance of toughness, processability and transparency needed for thermoforming applications in various rubber-modified resins where the rubber component is added during the polymerization process. In such processes, often referred to as mass or solution polymerization, the rubber component is added in solution, is formed into particles grafted with some of the monovinylidene aromatic polymer, crosslinked during the process, and ending up as dispersed particles having various types of particle morphologies and containing varying amounts of monovinylidene aromatic polymer trapped or occluded therein.

In EP 167,707, translucent rubber-modified polystyrene is prepared by polymerizing styrene with a polybutadiene (representing 5-50% of the total butadiene content) and a linear butadiene-styrene AB block copolymer in the presence of a peroxide radical initiator and mercaptans at elevated temperature to provide a dispersed soft phase (rubber particles) having an average particle diameter of 0.02 to 0.8 microns and provide improved notched impact strength and translucence.

U.S. Pat. No. 6,221,471 teaches polymer blends comprising a solution polymerized rubber modified monovinylidene aromatic polymer and a conjugated diene copolymer rubber, which can be used to produce cost effective, transparent packaging materials with a good toughness. Those blends comprise dispersed particles having a core/shell morphology and a volume average particle size of from 0.1 to 0.4 microns and a dispersed conjugated diene copolymer rubber.

There is always the need, however, for resins having improved combinations of toughness, transparency and processability for successful use in thermoforming applications. Therefore, there remains a need for polymer compositions which can produce cost effective transparent packaging and containers, which can be used in food, beverage and other applications and can be used in conventional thermoforming lines with the ability to be readily recycled.

SUMMARY OF THE INVENTION

The present invention is a rubber modified monovinylidene aromatic polymer composition comprising: a) a monovinylidene aromatic polymer matrix; b) from about 1.5 to about 8 percent by weight rubber (based on total diene content in the composition) dispersed as crosslinked rubber particles having primarily a core/shell morphology and a volume average particle size of from about 0.1 to about 1.5 microns; where from about 40 to about 90 volume percent of the rubber particles have diameters of less than about 0.4 microns and from about 10 to about 60 volume percent of the rubber particles have diameters between about 0.4 and about 2.5 microns and the rubber comprises a conjugated diene block copolymer rubber comprising from about 15 to about 60 percent by weight monovinylidene aromatic monomer block; and c) optionally from 0.1 to 4 weight percent mineral oil.

In other embodiments, the composition according to the present invention comprises from about 2 to about 6 percent by weight rubber, at least about 80 percent of the rubber particles have a core/shell morphology and the volume average particle size is from about 0.2 to about 1 micron. In further aspects, in polymer compositions according to the invention from about 50 to about 80 volume percent of the rubber particles have diameters of less than about 0.4 microns and from about 20 to 50 volume percent of the rubber particles have diameters of from about 0.4 to about 1.2 microns and the rubber is a blend comprising conjugated diene block copolymer rubber with from about 2 to about 25 weight percent of conjugated diene homopolymer rubber.

The present invention also includes such polymer compositions wherein at least 90 volume percent of the total rubber particles have core/shell morphology and the volume average particle size of the rubber particles is from 0.2 to 0.6 micron.

In further preferred embodiments, the present invention is a sheet suitable for thermoforming produced from the polymer composition and desirably having a thickness up to about 4.5 mm as well as a film produced from the polymer composition and desirably having a total thickness of up to about 0.25 mm.

Improved thermoformed articles and thermoforming process are also provided. In a particular aspect, the present invention is an improved thermoforming process using sheet material prepared from the subject resins comprising the steps of (a) positioning a heated sheet prepared from such resin to a position over a mold cavity; (b) stretching/drawing the softened sheet material into a mold cavity with air pressure and/or vacuum and/or mold plug to provide the shape of the molded article and cut the article from the sheet; (c) removing the thermoformed article from mold; and (d) recycling the remaining sheet material with additional amount of such polymer and providing in sheet form to a thermoforming process.

The novel polymer compositions of this invention can be used in conventional thermoforming applications to produce cost effective, tough, transparent packaging systems or containers for food, beverages and other markets.

DETAILED DESCRIPTION OF THE INVENTION

Monovinylidene aromatic homopolymers and copolymers (collectively referred to as "polymers" or "(co)polymers") are produced by polymerizing monovinylidene aromatic monomers such as those described in U.S. Pat. Nos. 4,666,987, 4,572,819 and 4,585,825, which are herein incorporated by reference. The monovinylidene aromatic monomer suitable for use in the matrix polymer component, graft polymerization onto the rubber and copolymerization into the copolymer rubber component is preferably of the following formula:

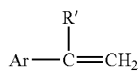

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical monovinylidene aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof with styrene being the most preferred. The monovinylidene aromatic monomer suitable for use in the matrix polymer component can be copolymerized with minor amounts of up to about 30 weight percent of one or more of a range of other copolymerizable monomers. Preferred comonomers include nitrile monomers such as acrylonitrile, methacrylonitrile and fumaronitrile; (meth)acrylate monomers such as methylmethacrylate or n-butyl acrylate; maleic anhydride and/or N-arylmaleimides such as N-phenylmaleimide. If a copolymer is employed, preferred copolymers contain at least about 80, preferably at least about 90 weight percent monovinylidene aromatic monomer based on weight copolymerizable monomer.

The monovinylidene aromatic polymer matrix component of the resin compositions according to the present invention typically have a sufficiently high weight average molecular weight (Mw) to provide the required level of processability and mechanical properties in the composition, which is typically a Mw of at least about 100,000, preferably at least about 120,000, more preferably at least about 130,000 and most preferably at least about 140,000 grams per mole (g/mol).

The monovinylidene aromatic polymer component of the resin compositions according to the present invention typically have an Mw that is less than or equal to about 260,000, preferably less than or equal to about 250,000, more preferably less than or equal to about 240,000 and most preferably less than or equal to about 230,000 grams per mole (g/mol) in order to provide sufficient processability.

The monovinylidene aromatic polymer component of the resin compositions according to the present invention typically have a number average molecular weight (Mn) of at least about 30,000 preferably at least about 40,000, more preferably at least about 50,000 and most preferably at least about 60,000 grams per mole (g/mol).

The monovinylidene aromatic polymer component of the resin compositions according to the present invention typically have an Mn that is less than or equal to about 130,000 preferably less than or equal to about 120,000, more preferably less than or equal to about 110,000 and most preferably less than or equal to about 100,000 grams per mole (g/mol).

Along with these values for Mw and Mn, the ratio of Mw/Mn, also referred to as the polydispersity or molecular weight distribution, should desirably be at least about 2, preferably greater than or equal to 2.3 and less than or equal to 4, preferably less than or equal to 3. As used herein, the terms Mw and Mn for the monovinylidene aromatic polymer refer to weight and number average molecular weights as determined by gel permeation chromatography using a polystyrene standard for calibration.

The rubber used for the rubber modified monovinylidene aromatic polymers or copolymers of the present invention is a conjugated diene copolymer rubber or a blend further comprising a minor amount of a rubbery conjugated diene homopolymer. The conjugated diene in both rubbers is typically a 1,3-alkadiene, preferably butadiene and/or isoprene, most preferably butadiene.

Suitable conjugated diene copolymer rubbers are also known and include copolymers containing, in polymerized form and on a elastomeric polymer weight basis, from 40 to 90 percent of a conjugated diene, preferably a 1,3-alkadiene monomer such as butadiene or isoprene, and from 10 to 60 weight percent of one or more monoethylenically unsaturated comonomers such as the monovinylidene aromatic monomers described above, including styrene, and/or the ethylenically unsaturated copolymerizable monomers including acrylonitrile, methacrylonitrile, methyl methacrylate, ethyl acrylate and the like. Preferred copolymer rubbers contain at least about 45 weight percent of the 1,3-alkadiene monomer, preferably at least about 50 weight percent, preferably at least about 55 weight percent and more preferably at least about 60 weight percent and less than or equal to about 85 weight percent 1,3-alkadiene monomer, preferably less than or equal to about 80 weight percent of the 1,3-alkadiene monomer. Correspondingly, the amount of the copolymerized monoethylenically unsaturated comonomer(s) in the copolymer rubber is preferably at least about 10 weight percent, preferably at least about 15 weight percent and more preferably at least about 20 weight percent and less than or equal to about 50 weight percent, more preferably less than or equal to about 45 weight percent and more preferably less than or equal to about 40 weight percent.

These copolymer rubbers are preferably block copolymers such as the types AB, ABA, tapered AB and ABA, and copolymers with varying degrees of coupling including branched or radial (AB)n and (ABA)n copolymers, where A represents a polymerized monovinylidene aromatic monomeric compound and B represents a polymerized conjugated diene, and "n" is a whole number greater than 2. Other resinous block copolymers with different sequences of A and B blocks can also be used as the copolymer rubber in the present invention. Preferred types are diblock rubbers (AB-type), but ABA or mixtures of ABA and AB, can also be used.

The A blocks could be polymerized styrene, alpha-methylstyrene, 4-methylstyrene, 3-methylstyrene, 2-methylstyrene, 4-ethylstyrene, 3-ethylstyrene, 2-ethylstyrene, 4-tertbutylstyrene, 2,4-dimethylstyrene and condensed aromatics such as vinyl naphthalene and mixtures thereof. Presently preferred is styrene. The rubbery B block could be polybutadiene, polypentadiene, a random or tapered monovinylidene aromatic/conjugated diene copolymeric block, polyisoprene, a random or tapered monovinylidene aromatic-isoprene copolymeric block, or mixtures thereof. Presently preferred is butadiene and/or isoprene.

The preferred copolymer rubber has a weight average molecular weight (Mw) of at least about 100,000, preferably at least about 150,000 g/mol and less than or equal to about 350,000, preferably less than or equal to about 300,000, more preferably less than or equal to 250,000. The weight average molecular weight values for this and any other rubber component are referred to as true weight average molecular weights and are measured with Tri Angle Light Scattering Gel Permeation Chromatography.

Such block copolymers and methods for their production are well known in the art, and are described in G. Holden, et al; THEMOPLASTIC ELASTOMERS 2ND EDITION; Hanser/Gardner Publications, Inc., 1996, ISBN 1-56990-205-4, pages 48-70. They are also described in H. Hsieh and R. Quirk, ANIONIC POLYMERIZATION: PRINCIPLES AND PRACTICAL APPLICATIONS, Marcel Dekker Inc., 1996, ISBN 0-8247-9523-7, pages 307-321, and 475-516.

Preferably the conjugated diene copolymer rubbers used in the compositions according to the invention have solution viscosities in the range of from about 5 to about 100, preferably from about 20 to about 80 centipoise ("cP"); and cis contents of at least about 20%, preferably at least about 25% and more preferably at least about 30% and less than or equal to about 99%, preferably less than or equal to about 55% and more preferably less than or equal to about 50%. Buna BL 6533 T brand rubber and other similar rubbers are preferred for use. For reference and comparison herein and with other references, solution viscosity units of centipoise are equivalent to milli pascal seconds (mPa.s) and a pascal second (Pa·s) is equal to 10 poise or 1000 centipose.

Conjugated diene homopolymer rubbers can also be advantageously used in the compositions according to the present invention. Conjugated diene homopolymer rubbers that are suitable for use are generally known, having a second order transition temperature of 0° C. or less, preferably −20° C. or less. Preferably they have a solution viscosity in the range of from about 20 to about 250 centipoise (cP), preferably from about 80 to about 200, and a cis content of at least about 20%, preferably at least about 25% and more preferably at least about 30% and less than or equal to about 99%, preferably less than or equal to about 55% and more preferably less than or equal to about 50%. Preferably they have a weight average molecular weight of from about 100,000 to about 600,000 g/mol, preferably from about 150,000 to about 500,000 g/mol (measured by Tri angle Light Scattering Gel Permeation chromatography). These polymers can be linear or branched. Diene 55 brand rubber (trademark of Firestone) and other similar rubbers are preferred for use.

The rubber content of the final rubber modified monovinylidene aromatic polymer composition of the present invention is measured by counting only diene content from the copolymer rubber component and not including any copolymerized monovinylidene or other non-diene monomer that is part of the copolymer rubber. In order to obtain the desired level of mechanical strength and toughness in low strain rate deformations (such as tensile strength at 5 mm/min deformation rate) and specifically elongation at rupture in the tensile strength test, the rubber modified monovinylidene aromatic polymer compositions according to the present invention will typically have a rubber content of at least about 1.5 weight %, preferably at least 2.0 weight %, more preferably at least 2.5 % and most preferably at least 3 weight % percent by weight, based on the total weight of the rubber modified monovinylidene aromatic polymer composition. In order to provide the desired transparency, the rubber modified monovinylidene aromatic polymer compositions according to the present invention will typically have a rubber content of less than or equal to about 8 weight percent, preferably less than about 6 weight percent, more preferably less than about 5.5 weight percent, more preferably less than or equal to about 5 weight percent, more preferably less than or equal to about 4.5 weight percent and most preferably less than or equal to about 4 weight percent by weight diene, based on the total weight of the rubber modified monovinylidene aromatic polymer composition.

It has been found that minor amounts of a conjugated diene homopolymer rubber can contribute to the mechanical performance of the resin and specifically to reaching the levels of elongation at rupture for the application. In order to obtain this result, if used, the conjugated diene homopolymer rubber content of the rubber component in the compositions according to the present invention will typically be at least about 2 percent by weight based on total diene content, preferably at least 4 weight percent, more preferably at least 6 weight percent, and most preferably at least 8 percent by weight, based on the total diene weight. In order to maintain a lower average particle size and avoid poor transparency, if used, the conjugated diene homopolymer rubber content of the rubber component in the compositions according to the present invention will typically be less than or equal to about 25 percent by weight, preferably less than or equal to about 20 percent by weight, more preferably less than or equal to about 16 weight percent, and most preferably less than or equal to about 12 percent by weight, based on the total weight of the rubber component.

The melt flow rate of the polymer composition needs to provide good extrusion and thermoforming processability. This typically requires a melt flow rate as measured by ISO-1133 under Condition G (200 degrees C. and 5 kg) of at least about 1, preferably at least about 2, more preferably at least about 3 and most preferably at least about 4 g/10 min and generally less than or equal to about 15, preferably less than or equal to about 13, more preferably less than or equal to about 12 and most preferably less than or equal to about 10 g/10 min.

The rubber modified monovinylidene aromatic polymers or copolymers are produced by known methods of polymerizing monovinylidene aromatic monomers in the presence of a pre-dissolved elastomer, examples of which are described in U.S. Pat. Nos. 3,123,655 and 4,409,369, which are incorporated by reference herein. In particular, a preferred rubber modified monovinylidene aromatic polymer used in the blends of the present invention and the method for making, is disclosed in U.S. Pat. No. 5,491,195, incorporated herein by reference.

The conjugated diene copolymer rubber or, if using a blend of two rubbers, both starting rubber materials, is/are preferably dissolved in the monovinylidene aromatic monomer and/or optional process diluent and supplied to a reactor configuration suitable for polymerization of the resin composition. Preferably the rubber solution is fed into a series of agitated plug flow reactors with a series of temperature controlled zones. Preferably, mineral oil and a diluent are also fed to the reactor(s). In a preferred embodiment, a chain transfer agent can also be added to the reaction mixture before the first zone or into the first or second zones of the first reactor.

Although thermal (heat initiated) polymerization conditions are preferred, it is also possible to use low levels of a polymerization initiator selected from the known initiators including the peroxide initiators including the peresters, for example, tertiary butyl peroxybenzoate, tertiary butyl peroxyacetate, dibenzoyl peroxide, and dilauroyl peroxide, the perketals, for example, 1,1-bis tertiary butyl peroxycyclohexane, 1,1-bis tertiary butyl peroxy-3,3,5-trimethyl cyclohexane, and di-cumyl peroxide, and the percarbonates; and photo chemical initiation techniques. These initiators may be employed in a range of concentrations dependent on a variety of factors including the specific initiator employed, the desired levels of polymer grafting and the conditions at which the mass polymerization is conducted. If used, from about 50 to about 300, preferably from about 100 to about 200, weight parts of the initiator are employed per million weight parts of monomer.

During the polymerization, the rubber will be grafted with aromatic polymer and dispersed into particles. The dispersed, grafted rubber particles will typically have, per one part by weight of the raw material un-grafted rubber polymers, at least about 1, preferably at least about 2, more preferably about 3 parts by weight monovinylidene aromatic polymer and less than or equal to about 7, preferably less than or equal to about 6, and more preferably less than or equal to about 5 parts by weight of monovinylidene aromatic polymer grafted thereto and occluded therein.

The majority of the rubber particles dispersed within the rubber modified monovinylidene aromatic polymer matrix need to have a core/shell particle morphology, preferably at least 70 percent, more preferably at least 80 percent, more preferably at least 90 percent. As used herein the term core/shell morphology means that the rubber particles have a thin outer shell and contain a single, centered occlusion of the matrix polymer. This type of particle morphology is commonly also referred to in the art as "single occlusion" or "capsule" morphology. In contrast, the terms "entanglement" or "cellular" morphology refer to various other, more complex rubber particle morphologies that are known in the art and have structures that can be described as "entangled", "multiple occlusions", "labyrinth", "coil", "onion skin" or "concentric circle". As used herein, the core/shell rubber particle percentage is a numerical percentage based on counting 500 particles in transmission electron micrographic photos (TEM's).

The core/shell rubber particles in the compositions according to the present invention will typically have a volume average size of at least about 0.01 micron, preferably at least about 0.1 micron and more preferably at least about 0.3 micron and typically less than or equal to about 2.0 micron, preferably less than or equal to about 1.5 micron and more preferably less than or equal to about 1 micron, and most preferably less than or equal to about 0.6 micron. In addition to having an average particle size in this range, it has also been found to be important to obtain a relatively broad particle size distribution where the majority of the particles are smaller and having only a limited amount of larger particles. In particular, it has been found desirable to have a distribution where from about 40 to about 90 volume percent of the particles have diameters less than about 0.4 microns. Correspondingly, it has been found desirable to have a distribution where from about 10 to about 60 volume percent of the particles have diameters greater than about 0.4 microns and less than about 2.5, preferably from about 15 to about 55 volume percent and more preferably from about 20 to about 50 volume percent of the particles, have diameters greater than or equal to about 0.5 microns and less than or equal to about 2.5 microns. Preferably, for this component of relatively large particles, the specified percentage amounts of the particles have diameters less than about 2 microns, more preferably less than or equal to about 1.5 micron and more preferably less than or equal to about 1.2 microns. When it cannot be avoided, the compositions according to the invention may contain limited amounts of somewhat larger particles having some of these other particle morphology types but this will detrimentally affect the transparency of the final product.

As used herein, the volume average particle size refers to the diameter of the rubber particles, including all occlusions of monovinylidene aromatic polymer within the rubber particles. Average particle size and other rubber particle statistics and percentages can be measured by means of the Beckham Coulter: LS230 light scattering instrument and software. The use of this equipment for this application is discussed in the manufacturer's instructions and literature and in the JOURNAL OF APPLIED POLYMER SCIENCE, VOL. 77 (2000), page 1165, "*A Novel Application of Using a Commercial Fraunhofer Diffractometer to Size Particles Dispersed in a Solid Matrix*" by Jun Gao and Chi Wu. Preferably, with this equipment and software, the optical model used to calculate the rubber particle size and distribution statistics is as follows: (i) Fluid Refractive Index of 1.43, (ii) Sample Real Refractive Index of 1.57 and (iii) Sample Imaginary Refractive Index of 0.01.

Other additives may be included in the compositions of the present invention, such as mineral oil, other plasticizers and the like. For example, it has been found that, in appropriate amounts, mineral oil provides further improvements in the elongation at rupture of the final product. The rubber modified monovinylidene aromatic polymer compositions according to the present invention will typically have a mineral oil content of at least about 0.4 weight percent, preferably at least 0.6 weight percent, more preferably at least 0.8 weight percent and most preferably at least 1.0 weight percent, based on the total weight of the rubber modified monovinylidene aromatic polymer composition. In order to obtain the desired level of transparency in the final product, the rubber modified monovinylidene aromatic polymer compositions according to the present invention will typically have a mineral oil content of less than or equal to about 3 weight percent, preferably less than or equal to about 2.8 weight percent, more preferably less than or equal to about 2.6 weight percent and most preferably less than or equal to about 2.4 weight percent, based on the total weight of the rubber modified monovinylidene aromatic polymer composition.

The material is devolatilized and pelletized according to the known techniques. As known to those skilled in this area of technology, the devolatilization conditions can be used to adjust the crosslinking of the rubber particles and to thereby provide optimized mechanical properties.

Preferably, for use in thermoforming applications, it has been found desirable for resin compositions according to the present invention to have values for tensile yield in megaPascals (MPa) of at least 20; preferably at least 26 and more preferably at least 32, (ASTM D-638)

It is also preferable for thermoforming applications if resin compositions according to the present invention have values for elongation at rupture (in %) in the resin compositions of at least 10%; preferably at least 15% and more preferably at least 20%. (ASTM D-638)

It has also been found to be desirable for thermoforming if resins according to the present invention have tensile modulus values (in MPa) in the resin compositions of at least 1800, preferably at least 2,000 and more preferably at least 2,200. (ASTM D-638).

It is particularly desirable for thermoforming applications for the resins according to the present invention, prior to thermoforming, to provide haze values (in %) in 0.5 mm injection molded plaques of less than 60%, preferably less than 50% and more preferably less than 40%. (ASTM D-1003-95). Then, as discussed further below, the haze values in thermoformed articles having a wall thickness of about 200 microns will preferably be less than or equal to about 20 %, more preferably less than or equal to about 15%, more preferably less than or equal to about 10%. For thicker or thinner wall thicknesses, a 200 micron value can be calculated based on the turbidity values for the oriented polymer compositions as calculated from the haze and thickness values measured on the thermoformed article or part thereof.

The novel polymer compositions of this invention are preferably prepared directly as the product of a solution or mass polymerization process as discussed above. Alternatively, these directly prepared products can be used in a blend with additional amounts of one or more other, separately prepared monovinylidene aromatic monomer polymers or copolymers to engineer materials with a somewhat different range of cost/property balances as might be needed for some packaging or container applications. Alternatively, the final products could be prepared by blending an amount of separately prepared monovinylidene aromatic (co)polymer with an amount of rubber-modified polymer component having the rubber particle morphology and distribution needed to provide the final product rubber content in the proper range. Examples of other monovinylidene aromatic monomer polymers or copolymers which can be blended with or used to provide the compositions according to the invention include, but are not limited to, general purpose polystyrene, high impact polystyrene, monovinylidene aromatic copolymers (such as poly(styrene-acrylonitrile), styrene/diene block copolymers, styrene/diene random copolymers, vinyl aromatic/olefin monomer inter-polymers (such as ethylene/styrene copolymers).

The most surprising and beneficial effect of the compositions according to the present invention is the transparency/toughness combination that is obtained after fabrication and particularly when sheets are extruded and thermoformed into shaped articles. The products according to the present invention provided significantly better and unexpected results in this regard than were expected from known correlations between the haze of a molded resin plaque and the transparency obtained in thinner thermoformed articles. Although it is known and expected that thermoforming or other processes providing a similar, high degree of polymer orientation improve the transparency of rubber-modified resins based on occlusion-containing rubber, the resins according to the invention provide much better transparency in thermoformed articles than would have been expected based on the thermoforming of otherwise similar rubber-modified, solution or mass polymerized monovinylidene aromatic polymers. Other processes providing a similar, high degree of polymer orientation include extrusion blow molding and injection stretch blow molding of bottles, containers or other hollow articles and biaxial stretching or bubble blowing of oriented films.

According to optical laws known to those skilled in this art, the transmittance can be expressed as a function of turbidity ("$\tau$") and sample thickness ("x") according to the following equation:

$$\text{Transmittance} = 100\frac{I}{I_o} = 100\ e^{-\tau x}$$

$$\text{Haze \%} = 100 - \text{Transmittance \%}$$

where I is the transmitted intensity and $I_o$ the incident intensity and the turbidity ($\tau$) is a parameter inherent to the material.

For most materials, therefore, the haze of molded parts should only change as a function of part thickness. This does not apply to high impact polystyrene systems due to their heterogeneous nature. Rubber particles orient under shear fields during thermoforming and some other processes and the rubber wall thins as a result of this orientation. If the material is cooled down fast enough, the particles will not have time to relax and this will change the rubber domain morphology as well as the value of $\tau$ for this type of system. An example of this behaviour will be shown in the examples section.

The materials of this invention are different from standard, mass or solution polymerized high impact polystyrene in that the rubber particle size distribution as specified is relatively broad and the majority of the rubber particles have a core-shell morphology. In contrast, conventional HIPS resins tend to have a relatively narrow particle size distribution and have predominantly or at least a larger percentage of cellular, multi-occlusion particle structures. Core-shell particles in the compositions according to the invention are crosslinked to the degree that they will stretch but not break under shear fields (i.e. during thermoforming or other highly orienting process). Their thinner walls (as a result of higher compatibility coming from the presence of copolymer rubbers) will become even thinner but remain intact to provide the needed mechanical and tensile strength properties. It is believed that the oriented rubber morphology, because there are so few, if any, multi-occlusion particles in the system (cellular morphology), is very close to a co-continuous distribution of very thin ribbons of rubber. The very thin shell walls have better light transmittance than would result with thicker walls and definitely better than if there were residual cellular or multi-occlusion particles which do not distribute in this fashion when oriented such as during thermoforming.

When used in thermoforming and other highly orienting processing conditions, the compositions according to the invention provide excellent combinations of transparency and toughness and, very importantly, toughness under low strain rate conditions (from 0.1 mm/min to 2000 mm/min) that correspond to the typical usage of food and beverage packaging and containers.

In other aspects of the present invention, therefore, there are provided improved thermoformable sheets or films, improved thermoformed articles, an improved process for preparing thermoformed articles, an improved process for providing extrusion blow molded articles, and an improved process for providing injection stretch blow molded articles. In these aspects of the invention, the resin compositions as described above provide surprising combinations of processability, recyclability, toughness, gloss, transparency and other properties compared to prior art and commercially available resins and the articles prepared from them. In another embodiment, the compositions described above can be used to prepare multilayer sheet or film having, for example, three layers comprising a core or middle layer of a composition described above and outer layers of another resin located on each side.

Thermoformed articles, such as drink glasses and containers for foods such as dairy products, prepared from the resins according to this invention are surprisingly tough and transparent allowing see-through inspection of any materials contained by such thermoformed articles. Single or multilayer thermoformable sheet can be produced using known techniques in the art, including but not limited to known extrusion techniques. Single or multilayer films can be produced from the compositions described above using known cast, tenter frame or blown film techniques.

The thicknesses for sheet, blanks or other preformed starting materials for thermoforming applications and equipment are typically from 0.2 to 4.5 millimeters (mm) preferably from 0.3 to 3.75 mm, more preferably from 0.4 to 2.0 mm, and most preferred from 0.50 to 1.5 mm. Such sheets can be further processed by thermoforming into articles which have good impact strength and transparency. Thicknesses of less than 0.2 mm can also be achieved and used in applications where thin gauge materials are desired, such as transparent lids.

The thickness of films that can advantageously be prepared from resins according to this invention are typically less than 0.25 mm, preferably from 0.012 to 0.20 mm, more preferably from 0.018, more preferably from 0.020, more preferably from 0.023 and most preferably from 0.025 up to 0.15, preferably to 0.13, more preferably to 0.10, more preferably to 0.05, more preferably to 0.04, more preferably to 0.03 and most preferably to 0.025 mm.

The thermoformable sheets can be produced by the known flat die/calendaring mono- or coextrusion processes. This sheet can then be thermoformed into containers either "in-line" directly and without cooling after sheet production or "off-line" where the sheet is prepared, cooled and provided to the thermoformer. The thermoforming in either case can then be done by appropriate standard plug and mold thermoforming machines including "form-fill-seal" container lines. This sheet (monolayer or multilayer) can be used to produce form-fill-seal and other packaging having good transparency, barrier and toughness properties, as well as preformed packages or containers by standard thermoforming equipment.

The known thermoforming processes generally employ the following main steps:
1. Heat sheet to a temperature in range of 125 to 170° C. (if not using in-line process where sheet is already/still in a heat softened condition), depending upon (co)polymer heat softening temperature;
2. Position sheet in molding area over a mold cavity;
3. Start stretching/drawing the softened sheet material into a mold cavity with air pressure and/or vacuum and/or mold plug. This can be done sequentially or in combinations of two or more at once. Preferably the stretching is started with positive air pressure on one side with minimized contact between the plug and the polymer material. A "plug" is a moveable mold part that forces the polymer sheet into a mold cavity and can be provided with a coating of Teflon or a silica material to reduce friction and sticking of the polymer.
4. Final shaping of the article with the plug using plug speed, force and shape to provide the final shape and uniform thickness in the thermoformed article and cut it away from the sheet.
5. Plug removed, mold opened and part removed, mold opens, part removed
6. The remaining sheet material, with holes corresponding to the removed, thermoformed areas (referred to as the "skeleton") is removed and preferably recycled.

The resin sheets of the present invention are typically thermoformed at high speeds using well known techniques such that the polymers are oriented as discussed above and the thermoformed articles exhibit good transparency and toughness properties. The sheet thermoforming temperature is typically below 170° C. and is preferably between 125 and 150° C. The thermoforming process drawing speed (strain rate) is generally above 200 mm/second, and is preferably between 220 and 340 mm/second as measured by using the thermoforming cycle time in cycles per minute and knowing the time and height of the plug assist and the height or depth dimension of the thermoformed article made each cycle.

Thermoformed articles prepared using this process are surprisingly transparent and tough when the draw down ratio of the article is at least about 0.1, preferably at least about 0.4, more preferably at least 0.6 and most preferably is at least 0.8 and is less than or equal to about 10, preferably less than or equal to about 7, preferably less than or equal to 1.8, more preferably less than or equal to 1.6. As used herein, the draw down ratio is the ratio of the height or depth dimension of the article to the greatest diagonal or diameter dimension of the mold cavity area.

Regarding the haze measurements on thermoformed articles, it is recognized that there will be thickness variations in most thermoformed articles that will result in variations in haze as measured or observed at those locations. One major advantage provided according to the present invention is the generally low haze and also the low turbidity gradient observed when the above-described compositions are thermoformed into articles. As shown in the haze/turbidity/thickness relationship above, with low turbidity, there will be much less haze differential in locations of the thermoformed articles where there are thickness variations. Depending on the thickness of the thermoformed article, it will typically have haze values of less than 20 percent, preferably less than 15 percent and most preferably less than 10 percent (measured in an area about 200 microns in thickness) once thermoforming is complete. The haze and transparency values were determined with a Hunter Lab Tristimulus Colorimeter Model D25P-9 with glass test standard numbered 425 in accordance with ASTM Method D1003-95.

The following examples are provided to illustrate the present invention. The examples are not intended to limit the scope of the present invention and they should not be so interpreted.

EXAMPLES

The rubber component(s) shown in Table 1 below were dissolved together in styrene in the ratios shown in Table 3 below to prepare the indicated resin products. Also included in this feed stream was 2.5 weight percent mineral oil (70 centistokes kinematic viscosity). The rubber blend content in the feed and the feed rates of styrene and rubber to the reactor are calculated with a target of producing an end rubber-modified polystyrene product containing 4% of butadiene.

TABLE 1

| Rubber Components | | |
|---|---|---|
| | Conjugated Diene Copolymer Rubber | Conjugated Diene Homopolymer Rubber |
| Property | | |
| | Buna BL 6533 T (Bayer) | Diene 55 (Firestone ™) |
| Styrene Content/% | 40 | 0 |
| Vinyl Content/% | 9 | 11 |
| Cis Content/% | 38 | 38 |
| Mooney Viscosity ML1 + 4 100 C. | 45 | 70 |
| Solution Viscosity (5.43% in toluene)/cP | 40 | 170 |
| Other | AB Block copolymer | Generally linear |

Sample compositions were produced in a continuous process using three agitated reactors working in series. The rubber feed solution, mineral oil, ethyl benzene, styrene and the rest of the additives were supplied to the first reactor at a rate of 750 g/h. The rubber concentrations and EB concentrations in the feed are given in Table 3 as a weight percentage of total feed. The final conversions to polymer are also provided in this Table. The rubber composition in the final product can be calculated from the conversions and the rubber content in the feed. In all cases, 0.1% of total feed of Antioxidant Irganox 1076 was added to provide levels of about 1200 ppm in the final product. Each reactor is divided into 3 zones that control temperature independently. The temperature profile used was: 125, 130, 135, 143, 149, 153, 157, 165, 170° C. The agitation used in the first reactor is given in Table 3, in the second was 50 rpm and in the third 25 rpm. Different levels of a chain transfer agent (n-Dodecyl Mercaptan or nDM) as summarized in Table 3 below, were added in the first reactor, into the second zone of the series of nine reactor zones.

A devolatilizing extruder was used to flash out the residual styrene and ethylbenzene diluent and crosslink the rubber. The temperature profile in the extruder was: start of barrel: 240° C., medium zone of barrel: 240° C.; final zone of barrel: 240° C. and screw temperature: 220° C.

Table 3 summarizes the raw materials, reaction conditions and the properties of the HIPS materials obtained with these rubbers. Table 3 also compares these resins with two comparative blend resins containing a rubber component and a standard general purpose polystyrene or "GPPS" (STYRON 678E brand PS) having a weight average molecular weight of 240,000 and a MFR of 10.5 grams/10 min at condition G. The rubber component in the first comparative resin was 35 weight percent of standard HIPS (STYRON A-TECH 1200) containing about 8.5 weight percent of a low cis polybutadiene rubber (based on butadiene) in the form of cellular particles having a volume average rubber particle size of about 2 microns. The rubber component in the second blend resin was about 50 weight percent of STYROLUX 3G35 brand SB block copolymer rubber containing about 73 weight % styrene and 27 weight % butadiene and having a melt volume rate of 15 grams/10 minutes at condition G (200 degree, 5 kg).

The test methods used were:

MFR—ISO-1133

PS Matrix molecular weight distribution—PS calibration Gel Permeation Chromatography.

Rubber Particle Size—Light scattering using an LS230 apparatus and software from Beckman Coulter.

Tensile Yield—ISO-527-2

Tensile Elongation—ISO-527-2

Tensile Modulus—ISO-527-2

Haze (injection molded plaque)—ASTM D-1003-95 using a 0.5 mm injection molded plaque Haze (thermoformed article)—ASTM D-1003-95 using a flat, 1 inch×1 inch square piece free from topological defects cut from the thermoformed part and having a thickness of about 200 microns.

Gloss (injection molded plaques)—ASTM D-523-89 using the indicated Table 2 injection molding conditions.

Part thickness was measured with an ABSOLUTE Digimatic Caliper from Mitutoyo.

TABLE 2

Injection moulding conditions

|  | Haze | Gloss |
|---|---|---|
| Screw Diameter/mm | 35 | 25 |
| Holding Pressure/Bars | 500-900 | 50 |
| Holding time/s | 5-15 | 3 |
| Mold Temperature/C. | 50 | 40 |
| Polymer melt temperature/C. | 235 | 235 |
| Cooling time/s | 25 | 25 |
| Back Pressure/Bars | 125 | 50 |

TABLE 3

Resin Production Examples

|  | Example 1 | Comparative Blend of GP and HIPS | Comparative Blend of GP and SB block copolymer rubber |
|---|---|---|---|
| Diene 55 concentration/% in feed | 0.3 | N/A | N/A |
| Buna 6533 concentration/% in feed | 4.5 | N/A | N/A |
| Styrene | Balance | N/A | N/A |
| EB Concentration in the feed/% feed | 7 | N/A | N/A |
| Conversion to polymer/% feed | 80 | N/A | N/A |
| nDM addition to Zone 2/ppm | 100 | N/A | N/A |
| First agitator rpm | 80 | N/A | N/A |
| Butadiene Content/% In final product | 3.8 | 3 | 12.2 |
| Matrix Mw/g/mol | 189,000 | 210,000 | N/A |
| Matrix Mn/g/mol | 87,000 | 80,000 | N/A |
| Mw/Mn | 2.2 | 2.6 | N/A |
| Vol Avg Particle size μm | 0.32 | 2.0 | N/A |
| Particle morphology (% core/shell) | >90 | <50 | N/A |
| Particle Vol % <0.4 μm diameter | 65 | 0 | N/A |
| Particle Vol % 0.4-2.5 μm diameter | 35 | 100 | N/A |
| Diene Homopolymer-wt % in Product | 0.38 | 3 | N/A |
| Diene Copolymer - wt % in Product | 5.6 | — | N/A |
| Mineral Oil - wt % in Product | 2.5 | 3.3 | 3.2 |
| M.F.R./g/10 min | 8.4 | 8.5 | >10 |
| Vicat/° C. | 99.8 | 99 | <90 |
| Tensile Yield/MPa | 33.8 | 25.5 | 26 |
| Elongation at Rupture/% | 31 | 40 | 55 |
| Tensile Modulus in MPa | 2480 | 2650 | 2000 |
| Haze % (injection moulded plaque) | 33 | 66 | 8.5 |
| Gloss (60° angle) | >100 | 70 | >100 |

It is apparent from this table that a very desirable final mechanical/optical property balance is obtained according to the invention.

Thermoformed parts were prepared from the Example 1 resin according to the present invention and the two blend resins as summarized in Table 3 above. This will illustrate the optimized combinations of properties according to the invention and particularly, the improvement in optical properties as a result of the fabrication process.

Extruded sheets having a thickness of 1.1 mm were made on a flat sheet die and vertical roll stack extruder at a melt temperature of about 210° C. The extruded sheet was then thermoformed into yogurt containers having a capacity of approximately 125 grams. The cup was cylindrically shaped with straight walls and no taper conicity, a wall height (or depth) of 64.6 mm and a diameter of 54.6 mm at the circular opening, having a drawdown ratio of 1.2. The cup was thermoformed on a lab machine that is similar to and represents the set up of an industrial machine. The single cavity machine was equipped with a clamping frame, aluminum female mold cavity, vertical displacement syntactic foam plug, contact heating (135-145° C.) and regulated air positive pressure (3-6 bars). The 1.1 mm sheet was fed manually to produce a cup with wall thickness in the body of the cup between 130 and 225 micron, yielding a thickness distribution of 0.7 micron (calculated as follows: (sheet thickness/wall thickness)-(sheet thickness/bottom thickness). The cups appeared transparent visually and the haze was measured to be 6% at a wall location where the thickness was about 200 microns.

This resin according to the invention provides significantly better thermoforming processes and/or thermoformed article properties than the comparative blends of GP and K-resin or commercially available HIPS, as shown in the Table below, and, in contrast to thermoforming resins based on blends of GP and SB block copolymers, is easily recyclable. The toughness of a cup is evaluated by downwardly compressing the bottom of an upside down cup at a rate of 10 mm/s and measuring the total force required to press the cup bottom downward a distance of 3 mm. A cup measured by this method is also noted to be "brittle" if, after the 3 mm compression, the cup wall is cracked or broken.

TABLE 4

Key properties of Thermoformed Cups

| Sample | Haze - 0.5 mm IM plaque | Haze - 200 micron thermoformed part | τ - IM plaque | τ - thermoformed part | Toughness |
|---|---|---|---|---|---|
| Example 1 | 35 | 6 | 0.0008 | 0.0003 | No brittle cups |
| GP/HIPS (35/65) | 66 | 15 | 0.0021 | 0.0008 | No brittle cups |
| GP/SB block copolymer rubber (50/50) | 8.5 | 5 | 0.00018 | 0.00018 | No brittle cups |

A further rubber-modified monovinylidene aromatic film resin according to the present invention was prepared generally according to the process as described above having the specific features and composition as indicated below and was fabricated into oriented films.

TABLE 5

Film Resin Production

| | Example |
|---|---|
| nDM addition to Zone 2/ppm | 100 |
| Matrix Mw/g/mol | 195,000 |
| Matrix Mn/g/mol | 85,000 |
| Mw/Mn | 2.3 |
| Vol Avg Particle size μm | 0.35 |
| Particle morphology (% core/shell) | >90 |
| Particle Vol % <0.4 μm diameter | 65 |
| Particle Vol % 0.4-2.5 μm diameter | 35 |
| Diene Homopolymer- wt % in Product | 0.38 |
| Diene Copolymer - wt % in Product | 5.6 |
| Butadiene Content/% In final product | 3.8 |
| Mineral Oil - wt % in Product | 2.0 |
| M.F.R./g/10 min | 7.0 |
| Vicat/° C. | 101 |
| Tensile Yield/MPa | 30 |
| Elongation at Rupture/% | 25 |
| Tensile Modulus in MPa | 2480 |
| Haze % (injection moulded plaque) | 33 |
| Gloss (60° angle) | >100 |

Cast extruded sheet having a thickness of 1.47 mm was prepared from the resin described above using a flat sheet coathanger die equipped with a vertical 3-roll stack. Melt temperature was held at about 210C. The extruded sheet was subsequently biaxially oriented into films of varying thickness using a laboratory T. M. Long Film Stretcher. Prior to stretching, the extruded sheet was heated to a temperature of approximately 120° C. for 3 minutes. The sheet was then biaxially oriented using a simultaneous stretching mode at a rate of 0.5 inches per second. The films were stretched by approximately the same amounts in both the machine and transverse directions and the indicated stretch ratios are averages of the individual machine and transverse direction stretch ratios (stretched dimension to unstretched dimension).

For the 1.47 mm sheet, successful biaxial orientation could be accomplished at bidirectional stretch ratios from 2.5× to 5×. Although 120° C. was found to be an optimal temperature for biaxial orientation, a wide operating window for temperatures in the range of 95 to 125° C. and for stretch ratios could be employed.

Optical properties of haze and clarity were measured for the films, using ASTM test methods D-1003 and D-1746, respectively. The film samples obtained demonstrated excellent optical character, as evidenced by the data shown in the following table.

| Stretch Ratio (times) | Film Thickness (mm) | Haze (%) | Clarity (%) |
|---|---|---|---|
| 2.5 | 0.24 | 9 | 47 |
| 3 | 0.16 | 5.6 | 60 |
| 3.5 | 0.12 | 5.1 | 78 |
| 4 | 0.09 | 3.4 | 82 |
| 4.5 | 0.07 | 2.3 | 85 |
| 5 | 0.06 | 2.4 | 86 |

The improved optical properties of the biaxially oriented rubber-modified films are believed to be a result of the modification of the rubber phase morphology that occurs after the biaxial orientation process. Coming out of the resin production and in the cast or unoriented state, the crosslinked rubber particles exist as primarily submicron-sized, primarily core/shell morphology globules which scatter light and detract from the optical transparency. In the biaxially oriented state, the rubber phase becomes drawn out and more dispersed and approximates nearly a lamellar or thread-like morphology, with the rubber particles existing as very thin, elongated domains.

These biaxially oriented films were also tested for mechanical properties, such as ultimate tensile strength and ultimate elongation, using ASTM D-882. As evidenced by the data in the table below, the film exhibits improved tensile strength and elongation with increasing stretch ratio, and hence amount of biaxial orientation.

| Stretch Ratio (times) | Film Thickness (mm) | Ultimate Tensile Strength (MPa) | Ultimate Elongation (%) |
|---|---|---|---|
| 2.5 | 0.24 | 40.3 | 34 |
| 3 | 0.16 | 44.5 | 34 |
| 3.5 | 0.12 | 41.8 | 26 |
| 4 | 0.09 | 44.4 | 78 |
| 4.5 | 0.07 | 49.1 | 91 |
| 5 | 0.06 | 56.1 | 83 |

This result of improved transparency, while maintaining an acceptable balance of physical/mechanical properties, is not similarly observed as a result of otherwise similar biaxial orientation of other rubber-modified resins.

What is claimed is:

1. A film having a total thickness of up to about 0.25 mm produced from a rubber modified monovinylidene aromatic polymer composition comprising:
   a) a monovinylidene aromatic polymer matrix;
   b) from about 1.5 to about 8 percent by weight rubber (based on total diene content in the composition) dispersed as crosslinked rubber particles having primarily a core/shell morphology and a volume average particle size of from about 0.1 to about 1.5 microns; where from about 40 to about 90 volume percent of the rubber particles have diameters of less than about 0.4 microns and from about 10 to about 60 volume percent of the rubber particles have diameters between about 0.4 and about 2.5 microns and the rubber is a blend comprising a conjugated diene block copolymer rubber comprising from about 15 to about 60 percent by weight monovinylidene aromatic monomer block with from about 2 to about 25 weight percent of conjugated diene homopolymer rubber based on the total weight of rubber in the composition; and
   c) optionally from 0.1 to 4 weight percent mineral oil.

2. A film according to claim 1 having a total thickness of from 0.012 to 0.20 mm.

3. A film according to claim 1 wherein the rubber modified monovinylidene aromatic polymer composition comprises from about 2 to about 6 percent by weight rubber.

4. A film according to claim 1 wherein the rubber modified monovinylidene aromatic polymer composition, at least about 70 percent of the rubber particles have core/shell morphology and the volume average rubber particle size is from about 0.2 to about 1 micron.

5. A film according to claim 1 where, in the rubber modified monovinylidene aromatic polymer composition, from about 50 to about 80 volume percent of the rubber particles have diameters of less than about 0.4 microns and from about 20 to 50 volume percent of the rubber particles have diameters of from about 0.4 to about 1.2 microns.

6. A film according to claim 1 where, in the rubber modified monovinylidene aromatic polymer composition, the monovinylidene aromatic matrix polymer is polystyrene.

7. A film according to claim 1 where, in the rubber modified monovinylidene aromatic polymer composition, at least 90 percent of the total rubber particles have core/shell morphology and the volume average particle size of the rubber particles is from 0.2 to 0.6 micron.

* * * * *

UNITED STATES PATENT AND TRADEMARK OFFICE
CERTIFICATE OF CORRECTION

PATENT NO. : 7,642,316 B2  Page 1 of 1
APPLICATION NO. : 11/191817
DATED : January 5, 2010
INVENTOR(S) : Rego et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this

Sixteenth Day of November, 2010

David J. Kappos
*Director of the United States Patent and Trademark Office*